United States Patent
Simpson, III

(10) Patent No.: US 7,378,821 B2
(45) Date of Patent: May 27, 2008

(54) METHOD AND APPARATUS USING VAR MEASUREMENTS TO CONTROL POWER INPUT TO A THREE-PHASE INDUCTION MOTOR CIRCUIT

(75) Inventor: Hugh Carden Simpson, III, Atwater, CA (US)

(73) Assignee: Enviro World Technologies, Inc, Merced, CA (US)

( * ) Notice: Subject to any disclaimer, the term of this patent is extended or adjusted under 35 U.S.C. 154(b) by 0 days.

(21) Appl. No.: 11/195,198

(22) Filed: Aug. 1, 2005

(65) Prior Publication Data

US 2007/0024250 A1   Feb. 1, 2007

(51) Int. Cl.
G05F 5/02 (2006.01)
(52) U.S. Cl. ........................... 323/205; 323/300
(58) Field of Classification Search ............... 318/729; 323/205, 299, 300
See application file for complete search history.

(56) References Cited

U.S. PATENT DOCUMENTS

| | | | |
|---|---|---|---|
| 3,959,719 A | 5/1976 | Espelage | |
| 4,052,648 A | 10/1977 | Nola | |
| 4,064,419 A | 12/1977 | Peterson | |
| 4,344,025 A | 8/1982 | Okuyama et al. | |
| 4,348,631 A | 9/1982 | Gyugyi et al. | |
| 4,379,258 A | 4/1983 | Sugimoto | |
| 4,417,190 A | 11/1983 | Nola | |
| 4,439,718 A | 3/1984 | Nola | |
| 4,453,122 A * | 6/1984 | Johnson et al. | 323/300 |
| 4,454,462 A | 6/1984 | Spann | |
| 4,459,528 A | 7/1984 | Nola | |
| 4,459,529 A | 7/1984 | Johnson | |
| 4,581,568 A | 4/1986 | Fitzpatrick et al. | |
| 4,677,364 A | 6/1987 | Williams et al. | |
| 4,710,692 A | 12/1987 | Libert et al. | |
| 4,767,975 A | 8/1988 | Unsworth | |
| 4,780,660 A | 10/1988 | Shima et al. | |
| 4,833,628 A | 5/1989 | Curran, Jr. | |
| 4,912,390 A | 3/1990 | Curran, Jr. et al. | |
| 4,950,970 A | 8/1990 | Davis, Jr. et al. | |
| 5,075,613 A | 12/1991 | Fisher | |
| 5,134,356 A | 7/1992 | El-Sharkawi et al. | |
| 5,187,427 A | 2/1993 | Erdman | |
| 5,241,256 A | 8/1993 | Hatanaka et al. | |
| 5,471,127 A | 11/1995 | Vaughan et al. | |
| 5,637,975 A * | 6/1997 | Pummer et al. | 318/729 |
| 5,684,377 A | 11/1997 | Kim et al. | |

(Continued)

Primary Examiner—Jeffrey Sterrett
(74) Attorney, Agent, or Firm—Craig M. Stainbrook; Stainbrook & Stainbrook, LLP

(57) ABSTRACT

A method and apparatus are described for controlling the flow of power in each input line to a three phase AC inductive load in order to reduce the amount of VAR in the system, and thus increase the operational efficiency of the inductive load. Solid state relays are positioned in series in each of the three inductive load line inputs, and current allowed to flow to the inductive load only during the time during which the SSRs are in a conducting state. The calculation of VAR is achieved by processing data from each of the input lines using a separate controller boards each dedicated to each of the lines. The controller in turn, based on the calculated VAR, increments the time, either increasing or decreasing it from a predetermined value, during which the SSRs in that line remains in the non-conducting state.

14 Claims, 5 Drawing Sheets

U.S. PATENT DOCUMENTS 5,723,966 A    3/1998   Straka et al.
5,818,238 A    10/1998  DeVilbiss
6,104,177 A *  8/2000   Fritsch et al. ............... 323/300
6,737,827 B2   5/2004   Cashatt

* cited by examiner

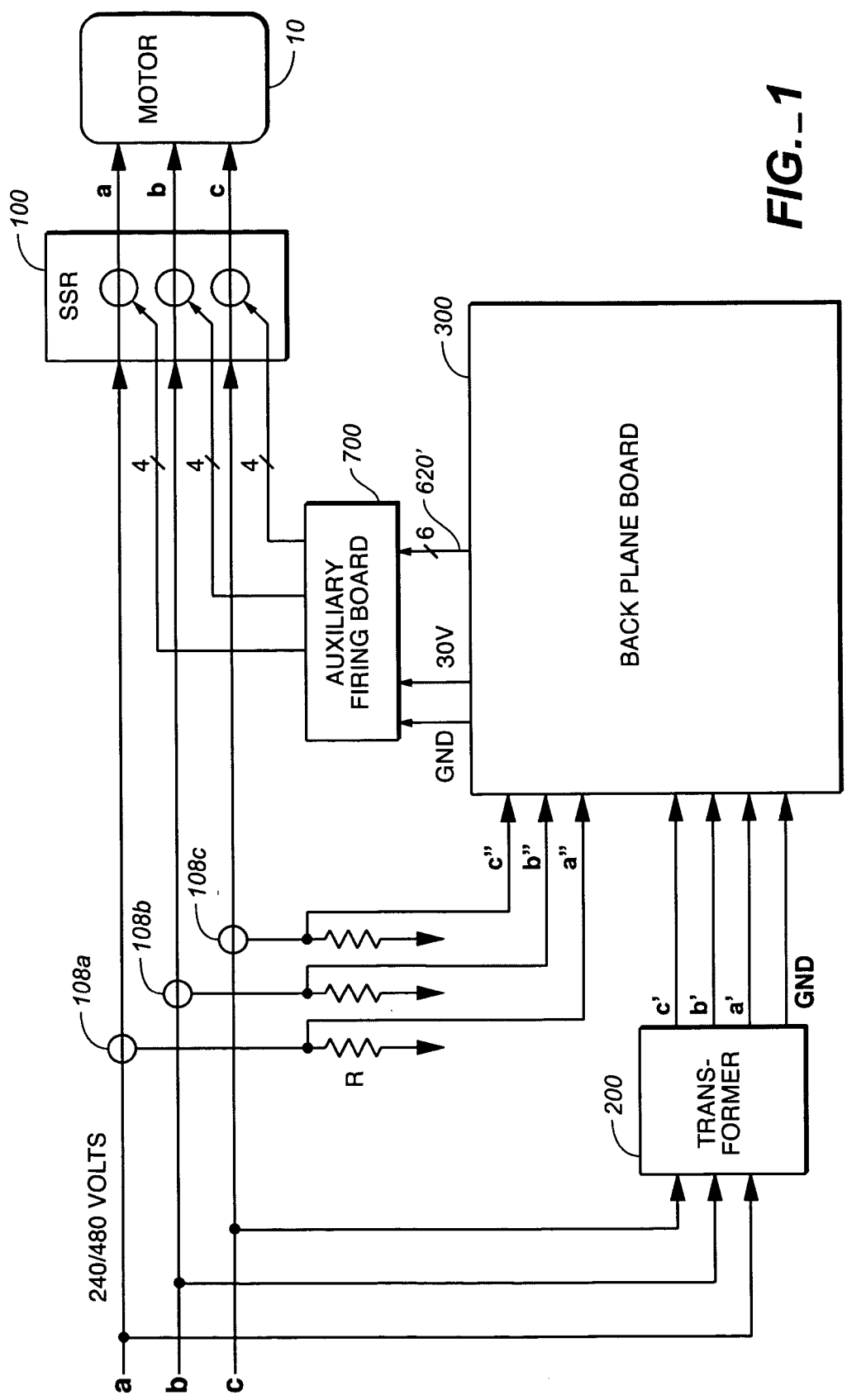
FIG._1

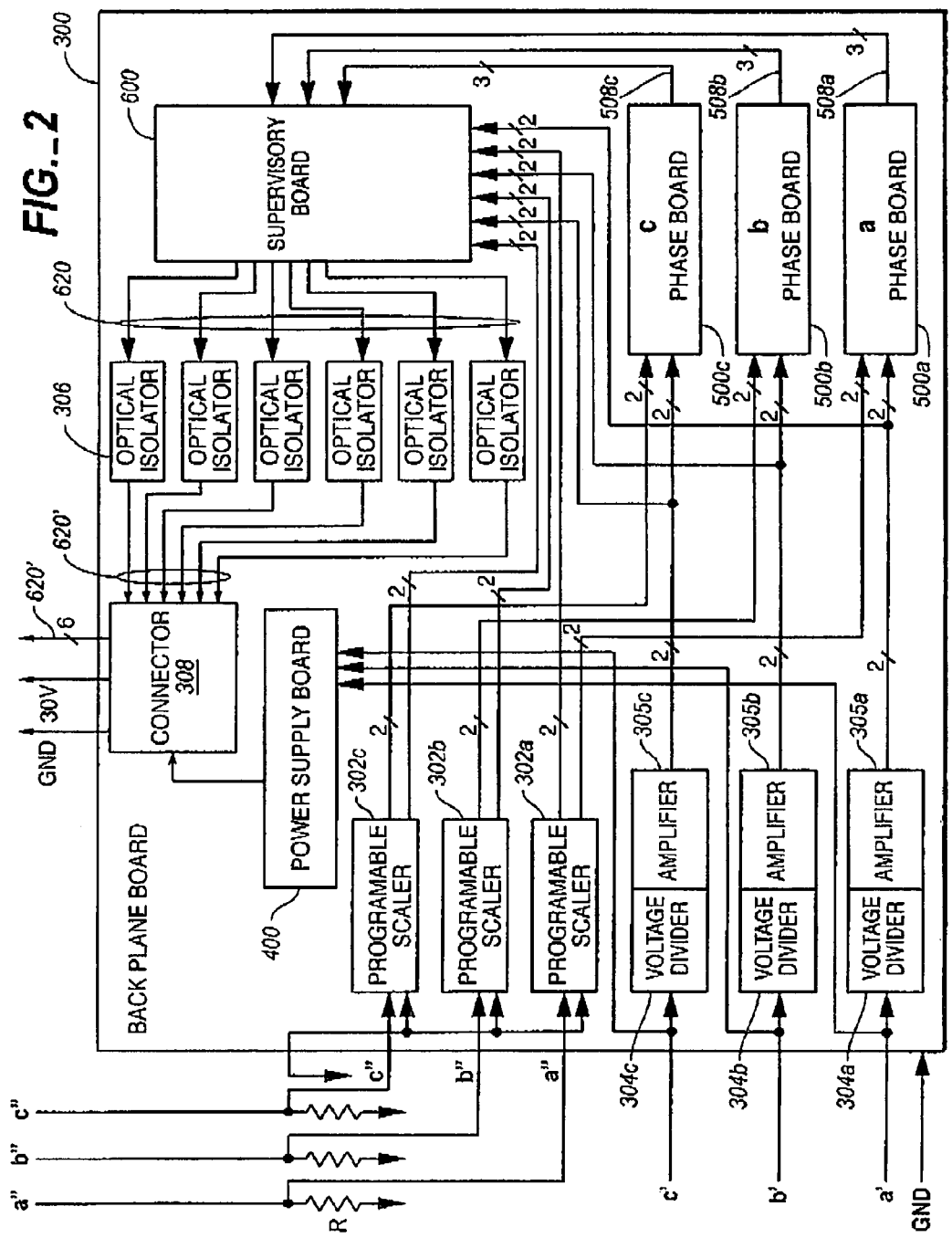
FIG._2

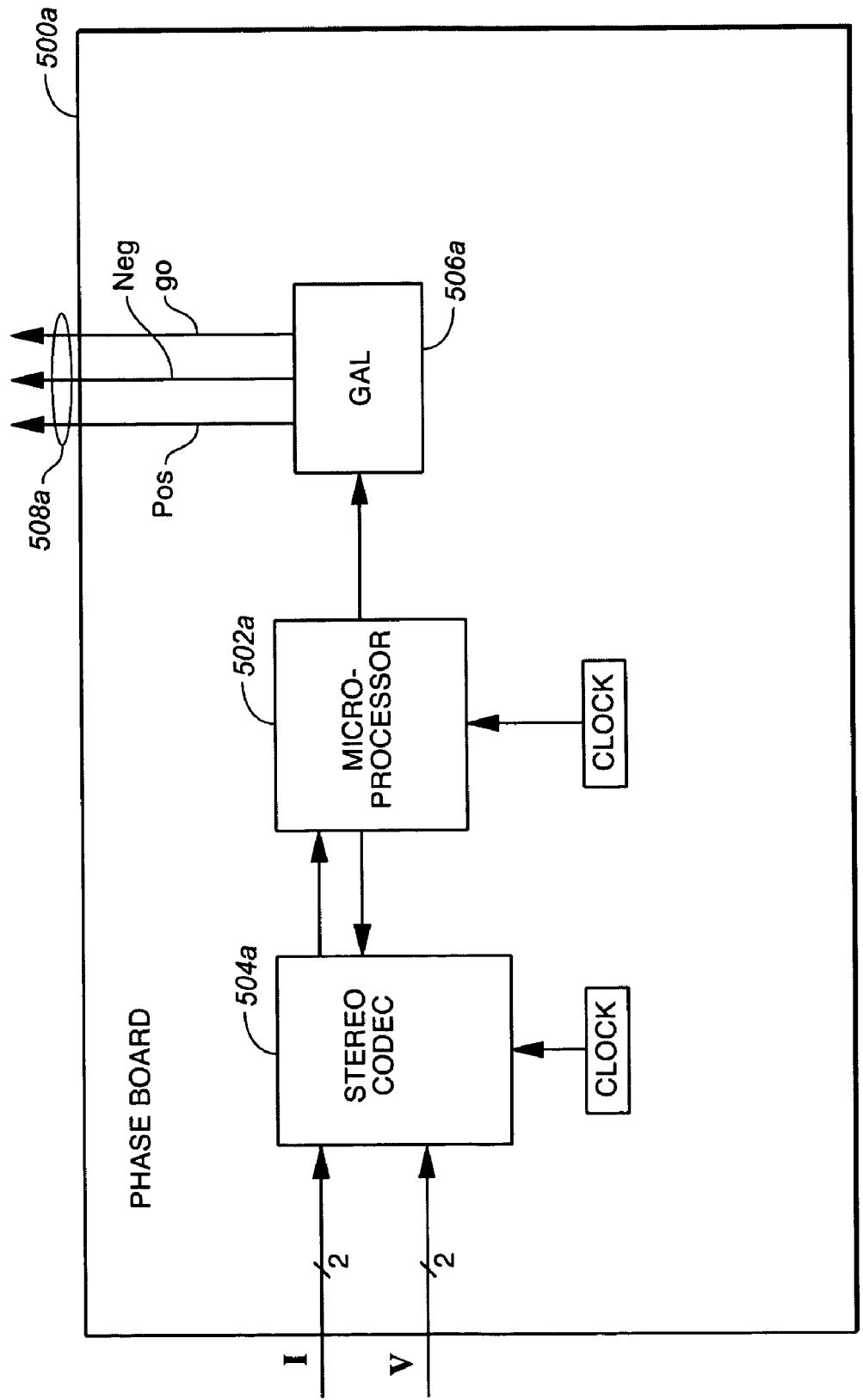
FIG._3

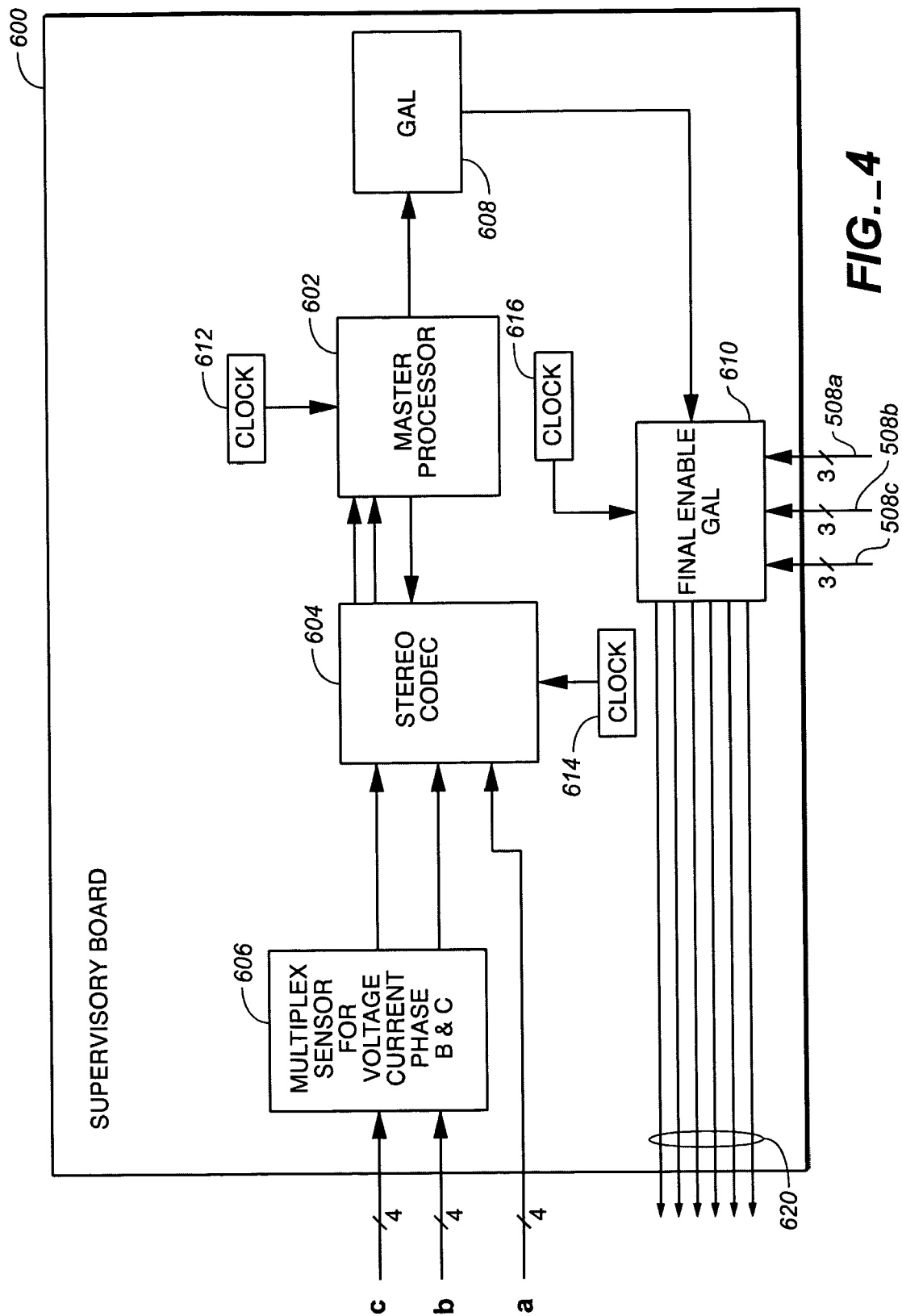
FIG._4

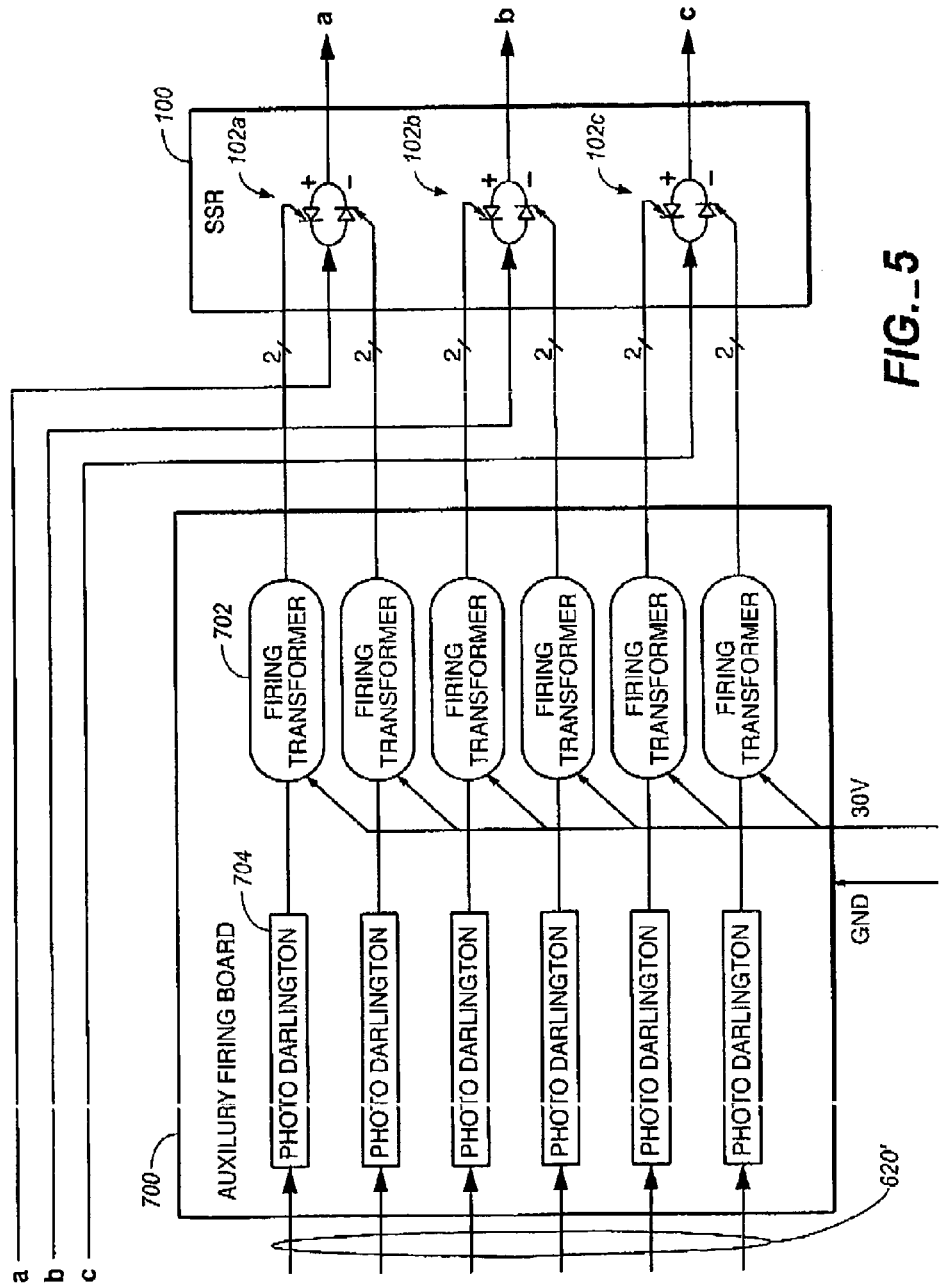
FIG._5

METHOD AND APPARATUS USING VAR MEASUREMENTS TO CONTROL POWER INPUT TO A THREE-PHASE INDUCTION MOTOR CIRCUIT

BACKGROUND OF THE INVENTION

1. Field of the Invention

This invention relates methods and apparatus for controlling the input to 3-phase alternating current (AC) induction motors. More particularly it relates to methods and apparatus for separately controlling the power being supplied through each of the three input lines to such a motor, using dedicated circuits to calculate the measure of reactive power and adjust the time during which solid state relays connected in series in each of the lines are maintained in a non-conducting state.

2. Description of the Related Art

It is well known that power is wasted when an alternating current (AC) induction motor is operated under a load below its rated load, or under a varying load. It is also well know that inherent in the operation of a three-phase alternating current induction motor is the presence of reactive power, expressed as voltamps reactive (VAR), the measure of VAR related to the operational inefficiency of the motor. The greater the VAR, the greater the loss of power in the system.

The presence of VAR is caused in part by the natural inductance of the motor windings, and the interaction of motor rotor and windings, which effects tend to exert a counter force to the flow of power to the system. Power in turn is the product of the instantaneous current (measured in amperes) times the instantaneous voltage (measured in volts) traveling in a wire connected to a motor. When voltage and current values are plotted on a point by point basis, with, for example, a vertical axis Y representing magnitude and a horizontal axis X representing time, separate waveforms are generated for both voltage and current. Generally sinusoidal, over a full current cycle, the separate wave forms for current and voltage during one half cycle will be on the positive side of X axis, and during the other half cycle will be on the negative side of the X axis. These same waveforms may also contain multiple harmonics. In the case of the three-phase motor when current and voltage are plotted together, because of the inductance, and generated voltamps reactance of the motor resulting from the movement of the rotor relative to the motor windings, this inherent "backpressure" causes the current waveform to lag the voltage waveform.

When the voltage and current values are taken from their respective waveforms and multiplied on a point by point basis along the X axis, a voltamp (VA) waveform is generated. When plotted along the X and Y axis, the VA waveform will generally have mostly positive values, and to a lesser extent negative values with reference to the X axis. During that period of operation where the VA waveform takes on a negative value and lies below the X axis, there is a loss of power being sent to the motor. It is this negative part of the waveform which lies below the X axis which is a measure of the voltamps reactive (VAR).

Previous attempts to increase the operating efficiency of AC induction motors are described in various U.S. patents, including U.S. Pat. Nos. 4,439,718 and 4,052,648 to Nola, U.S. Pat. No. 4,379,258 to Sugimoto and U.S. Pat. No. 5,134,356 to El Sharkawi et al.

Another approach is described in U.S. Pat. No. 6,737,827 to Cashatt, this patent commonly assigned to Enviro World Systems, Inc., and incorporated herein by reference. In Cashatt, a method and apparatus is disclosed to control the input to both single and three phase motors using a single microprocessor to manage the control circuits and calculate the time when the conducting state of in-line, solid state relays are to be changed from non-conducting to conducting. By controlling the timing of the change, the inventor therein was able to bring the voltage and current waveforms closer together, to thus reduce the amount of VAR generated, and thereby increase motor efficiency.

In practice, in the case of a three phase system it has been found that the calculations required to be performed by the microprocessor is substantial, and thus the operational speed by which calculations can be conducted for each of the three input lines limits the frequency by which the solid state relays (SSRs) can be switched on and off. In addition, the sum of the instantaneous current and voltage values in each of the three lines may vary, and thus inaccuracies in calculated values can result when these variations are not taken into account. Accordingly, there remains a need to improve the degree of control in the switching of the SSRs from the non-conducting to the conducting state in order to improve the operational efficiency of the motor being managed.

SUMMARY OF THE INVENTION

By way of this invention, three separate microprocessors are employed, each one assigned to perform the calculations needed to control the input to assigned input lines, to thus control the flow of power through that line. These three "slave" microprocessors are themselves controlled by a master microprocessor which regulates the overall operation of the control system, and instructs shut down of the system if a condition is detected which could cause motor damage. In a further embodiment of the invention, each of the slave microprocessors is mounted on its own circuit board, each of the three boards being identical so as to facilitate circuit replacement in case of burnout of any one board. The master microprocessor is likewise mounted on a separate circuit board, the system further including a power board for receiving the inputs from a transformer and stepping down the voltages before being distributed to the microprocessor boards, and an auxiliary firing board (which contains a series of firing transformers used to issue signals to the in-line solid state relays). The arrangement and operation of the overall system and the function of the various boards will be described hereinafter.

BRIEF DESCRIPTION OF THE DRAWINGS

So that the manner in which the above recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram of the overall system of the present invention illustrating various circuit boards and other circuit components for use with a three phase AC induction motor, in accordance with one or more embodiments of the present invention.

FIG. 2 is a more detailed view of the backplane circuit board, i.e. motherboard, used in the system of the present invention.

FIG. 3 is a schematic representation of an exemplary phase board for use with the present invention.

FIG. 4 is a schematic representation of an exemplary supervisory board for use in the present invention FIG. 5 is a schematic representation of an auxiliary firing board for use in the present invention, the board used to control the status of the individual SSRs.

DETAILED DESCRIPTION OF THE INVENTION

The operation of the system of the present invention and the arrangement of the circuits used herein will now be described with first reference to FIG. 1. Depicted therein is an incoming, three phase AC power source comprising three separate input power lines a, b, and c. The AC power in the lines is generally 120° out of phase between one line to the next, delivered from a power source at typical voltages of 240V or 480V. The power source is generally a power generation plant removed from the location of the motor 10 to be controlled. In one embodiment the power lines may connect to motor 10 through an intervening circuit breaker panel (not shown).

Input lines a, b, and c in turn are connected to the appropriate terminals of a three phase AC induction motor, to sequentially energize the motor windings which in turn drives the rotor of the motor. The operation of such three phase motors is well known in the art, and does not constitute a part of this invention. As such the operation of these motors will not be further described.

Positioned between power source input lines a, b, and c is three-phase solid state relay (SSR) component 100. The 3 relays of component 100 may comprise silicon controlled rectifiers (SCRs). In an embodiment of the invention, back to back SCR modules are used to control the flow of power in each of the incoming lines to the motor. Alternatively, optically activated SSRs can be used. These components are commercially available, off the shelf items, and whether to use SCR or optically controlled SSRs is a matter of design choice, and does not comprise an element of this invention.

In operation, power flows through input lines a, b, and c to the respective SSRs. With reference to the positive half cycle, when the voltage in a given line passes through the zero point as it changes from positive to negative, the enable signal to the SSR designed to maintain the SSR in the conducting state is turned off. With current lagging voltage, the current continues to flow until the current value reaches zero as it transitions from positive to negative. At that point, the SSR becomes non-conducting, i.e. it opens to break the circuit, and the flow of power through that SSR to the motor is interrupted. The SSR remains in this non conducting state until the time during the next positive half cycle when it receives a firing signal from an auxiliary firing board, the configuration of the firing board later described. The timing for the sending of the firing signal is computed using a dedicated controller (e.g., a microprocessor, or its functional equivalent, such as a digital signal processor (DSP)), which controller calculates the VAR from signals representative of the instantaneous line voltage and amperage. Then, based on the VAR value, the controller determines the delay to be applied to the sending of the firing signal. A similar sequence occurs during the negative half cycle when the polarity of the flow of power to the motor is reversed.

With reference to FIGS. 1 and 2, the monitoring and control circuits of the invention are auxiliary to and powered by the incoming power lines a, b, and c. Because of the high voltage in the incoming lines, and the low operating voltages of the control circuits, the voltage taps from the power lines are first directed to a transformer 200, such as a Delta/Wye transformer, which receives the 240 (or 480) volt source and steps it down to appropriate values for the proper operation of the power supply modules. In an embodiment of the invention, the selected transformer is capable of handling an input of either 480 or 240 Volts, depending upon how it is wired. Exemplary of such a transformer is one provided with three sets of primary winding pairs. If the windings of each pair are wired in parallel, the input voltage accommodated by the transformer is 240V. If wired in series, the input voltage accommodated is 480V. These types of transformers are commercially available, and come with wiring diagrams as to how to wire them for the alternative inputs. The output windings are designed to achieve the desired step down in voltage. These windings can also be customized, as desired. By way of illustration, in one embodiment of this invention, the output voltages a', b', and c' are stepped down to 16V, the selected step down voltage a matter of design choice, determined in part by the requirements of the components chosen for the construction of the various boards.

From transformer 200, the AC power is delivered to the system motherboard, that is, backplane board 300. In addition to a number of electronic circuits and discrete electronic components, the board contains a number of card slots for receiving a number of circuit board cards, each card containing additional electronic components, including slave controllers, exemplified as microprocessors on each of three phase cards, which are used to control the status of the solid state relays, and a forth, master controller disposed on a supervisory board, and used to monitor the operation of other microprocessors as well as the overall status of the system.

A power supply board 400 is used to convert incoming AC voltages from lines a', b' and c' to the analogue and digital DC voltages needed to drive the various electronic components employed in the system. To accommodate the range of voltage requirements for the selected electronic components, power supply board 400 can be set up to convert incoming analogue voltages into a plurality of differing analogue and digital voltages. For example, and without intending to limit the scope of the invention, the power supply board can be configured to output 2.5, 3.3, 5 (analogue and digital), 10, ±18 and 30 volt signals to accommodate component requirements.

On the power board, received voltages are first sent to a three phase rectifier (not shown) that converts the incoming AC power to a DC voltage. An exemplary output from the rectifier is 44 volts DC. This output is filtered by going through a filter module, and then routed to various on-board DC-DC modules which are selected to step the voltages down to a desired output, such as 5 volts DC. The different voltages are routed off the power board to backplane board 300 for distribution to, for example, the programmable scalers on the backplane board and various other system components for the powering of those components. In an embodiment of the invention, a DSP on the phase board is supplied with the required 2.5 and 3.3 volt sources, while at the same time the programmable scalers on the backplane board are supplied with the required 5.0 volt source, the different voltage requirements an artifact of using off the-shelf components, all of which are easily accommodated by the power supply board.

In order to calculate the product of volts times amps (VA) and ultimately compute the VAR of the system, both current and voltage in each of the three input power lines a, b, and c must be measured. Accordingly, separate current sensors 108a, 108b, and 108c are connected to each of the three input lines a, b, and c. Conventional, commercially available current sensors, such as those available from Honeywell, may be used, these sensors transforming by means of a resistor the analogue current passing through them into an output voltage a", b" and c" representative of the current, the magnitude of the output voltage compatible with voltage range of a downstream input scaler. As illustrated in FIGS. 1 and 2, the output of each of the three current sensors a", b", and c" is directed to one of the three dedicated scalers 302a, 302b and 302c on the backplane board. The scaler itself may be a programmable gain device, or amplifier, which scales the voltage to a preferred range, that is, the operational voltages to be used by the microprocessors of the system. While the voltage range of the scaler is not critical, it needs to be capable of handling the maximum voltage signal strengths that will be generated by the current sensors when the motor to be controlled is running at full load.

The scaler/amplifier module includes an electrically programmable, electrically erasable module (EEPROM). The supervisory controller during learn mode, as later described, continuously changes the EEPROM map until the correct (optimal) maximum output to the stereo codec to which the signal is directed has been established. An advantage of using such a programmable scaler is that its output voltage can be set to a preferred range by the supervisory microprocessor, and associated programs during the learn mode of operation, run at the time of initial installation and start up, so as to tailor it to the environment in which it will be operating. As a further advantage, the system can be used with a variety of different AC motors capable of running at different loads, without having to modify or custom design the system to accommodate a particular type or size of motor, with its designed maximum load capacity.

The tapped voltage outputs a', b' and c' from the transformer 200, are routed on the one hand to Power Supply board 400, and on the other hand to corresponding voltage dividers 304a, 304b, and 304c. In an embodiment of the invention the voltage dividers comprise two series resistors, with the common connection between the resistors, the reduced voltage output from each divider going to the input of discrete amplifiers 305a, 305b and 305c. In an embodiment of the invention, the divider drops the voltage to about 2 volts, peak to peak, or ±1 volt before it outputs to the amplifiers. The output from the amplifier is an AC differential signal. The amplifier separates the output into two, 180° apart signals. The differential outputs are then sent to associated phase boards 500a, 500b and 500c and supervisory board 600 as voltage inputs. The lengths of the wiring going to each board is adjusted, so that the signals are kept in phase form one phase board to the next. The stepped down tapped voltage in line a' represents the average vector sum of the voltages across lines a'+b', and a'+c', the stepped down tapped voltage in line b' the average vector sum of the voltages across lines b'+a' and b'+c', and the stepped down tapped voltage in line c' the average vector sum of the voltages across lines c'+b', and c'+a', these averages vector sums being the representative voltage readings used by the various phase board controllers to calculate the VAR in each of the input lines a, b and c.

In an embodiment of the invention, outputs from programmable scalers 302 a-c are routed to the associated phase boards 500 a-c containing dedicated microprocessors 502 a-c, as further illustrated in FIGS. 2 and 3. In the illustrated embodiment of FIG. 3, the voltage line to phase board 500a is first sent to stereo codec component 504a. The codec in an embodiment of the invention converts the analogue AC voltage output of the voltage divider/amplifier into a digital output which is then routed to phase board microprocessor 502a. There, the calculation of VA is performed and the measure of VAR determined.

The following discussion is directed to the manner of operation of the microprocessor in computing and comparing the calculated VAR during a given time period to a stored predetermined reference threshold value (the determination of which is later explained). For a given half cycle VAR max is determined during the half cycle. During the next half cycle of opposite polarity, whether or not to increment the time period (that is, the interval of time during which the SSR is to remain in the non-conducting state) is determined, and a pre-determined timing increment applied during the next, like half cycle.

The readings of voltage and current during a half cycle are continuously monitored, and the VAR calculation initiated when the microprocessor detects that voltage and current are of opposite polarity. At the beginning of a new half cycle, the VAR max value is reset to zero. Calculated in absolute values, the first calculated VAR is stored as VAR max. If the next calculation during the same half cycle is larger than the previously stored VAR max value, it replaces the previous value. The microprocessor continues to repeatedly sample and calculate VAR values during the half cycle, each time replacing the previously stored VAR max, with the new value, so long as that absolute value exceeds the previous VAR max value. This process is continued until the next VAR calculation is lower than the previous VAR calculation. At such time, the previous VAR max value is stored and used for the calculation of the delay.

During the next half cycle, for example the negative half cycle following a positive half cycle, the microprocessor performs two functions. First, it continuously samples voltage and current, and using these values calculates the VAR of the negative half cycle, storing the peak VAR value (VAR max) of that half cycle. It also performs the delay determination based on the VAR max of the previous positive half cycle to adjust the delay to be applied to the next positive half cycle.

The delay or wait time is adjusted in the following manner. During the next opposite half cycle (e.g. negative following positive), a predetermined reference threshold is used as a reference against which the calculated VAR max of the most recent positive half cycle is compared. If the new VAR max exceeds the threshold value by more than a predetermined amount, then the microprocessor increases the delay by a predetermined set value to be applied during the next like half cycle. If the VAR max is less that the reference threshold by a predetermined amount, then the microprocessor will incrementally decrease the delay by a set value. If the VAR max is significantly less that the reference threshold, this indicates that the load is rapidly increasing, and the microprocessor will decrease the delay to zero.

As can be seen from the above, the change in the delay value, i.e. the wait period, is incremented by a predetermined value in one direction or the other, the system software programmed to maintain the VAR about or around the threshold value. Thus, where the VAR max of a given half cycle is larger than the predetermined threshold, the delay is incrementally increased. In will be increased again in the next like half cycle, and continue to be increased, so long as the VAR max of the calculated half cycle exceeds the predetermined threshold value by the predetermined amount. At the point where the VAR max is the same as, or does not exceed the reference threshold by the predetermined amount, no incremental change value is applied. The wait period to be applied to the following like half cycle is thus unchanged and equals the same value as that of the previous like half cycle. Finally, in the case where the VAR max of the calculated half cycle is less than the reference threshold by a predetermined amount, the delay value will be decreased by a set value. The delay value will continue to be incrementally decreased until the VAR max of the calculated half cycle is the same as or exceeds the reference threshold by the predetermined amount. Should the load of the motor suddenly and substantially increase, the microprocessor will decrease the delay to zero.

A timer circuit of microprocessor 506a is used to control the release of an enable signal which ultimately controls the conducting state of the SSRs. The determined delay value is programmed into the timer as the timer setting, either lengthening or shortening the timed interval of the timer. At the moment a cycle starts, that is when voltage crosses zero from negative to positive or positive to negative, the timer starts, and begins its programmed countdown. When the timer gets to zero, it issues an interrupt signal, which interrupt signal allows an enable pin to go high, and thus issue the enable signal.

The reference threshold is a constant, predetermined value, which is loaded into the operating software of the control system as part of the fabrication of the system. The value of the constant is determined empirically from experiments conducted after the design and construction of a motor load controller having a particular layout design and selection of components, and observations of resulting motor efficiencies using various monitored reference settings. By way of example, the VAR max of a test motor can be used as a selected starting value for the reference threshold, and the test motor run, changing the selected value and monitoring the resulting efficiencies of the motor. The selected starting value is decreased incrementally until the motor approaches a condition of stall. The value is then backed off, and the system tested at higher loads to insure that the chosen reference threshold value is sufficient to prevent the motor from approaching the stall condition. Based on such testing, the reference threshold value is selected, and incorporated into the system software. This pre-loaded constant (which is independent of the motors in the field to be controlled) is then used by the microprocessor in the "compare" calculation when determining how to adjust the wait time for a given cycle in light of the calculated VAR max for a given motor.

With reference to FIGS. 2 and 4, the operation of the supervisory board 600 is next explained. The purpose of the supervisory board, which includes supervisory master microprocessor 602, is to control the initial learn function of the system during start up, as well as during operation monitor system status and the outputs from phase boards 500 a-c. In essence, it acts as the gatekeeper, looking for abnormalities which would constitute a reason for shutting down the system, and thus blocking the sending of the enable signals to activate the SSRs and ultimately prevent possible damage to the motor. By monitoring voltage/current readings in lines a, b, and c, including amplitude and phase, or loss thereof, supervisory master microprocessor 602 can flag a situation requiring system shut down. Lastly, system start up is controlled by the supervisory board, which among other things, on start-up while in Learn Mode sets the programmable scalers 302 a-c, and loads the reference threshold value used in connection with the timing of the signals being sent to the auxiliary firing board to change the on/off status of the SSRs.

With reference to FIG. 4, signals from programmable scalers 302 a-c are received by an on-board stereo codec 604, digitized by the codec and the data forwarded, in an embodiment of the invention, through two data lines to supervisory master microprocessor 602. The digitized voltage and current signals from the programmable amplifier and voltage divider/amplifier for phase a, sent as a serial stream on one of the data lines via the stereo codec to the supervisory microprocessor, represents the value of the measured voltage and current of phase a. The other of the two data lines carries the multiplexed voltage and current signals from the programmable amplifiers and voltage divider/amplifiers of phases b and c, the data sent as a serial stream to the supervisory microprocessor, the digitized data representative of the voltages and currents of phases b and c.

In one embodiment, the voltage signal from voltage divider/amplifier 304a and current from programmable scaler 302a is sent directly to the codec 604. In this embodiment where the supervisory codec is the same codec chip as used on the phase boards 500 a-c, the exemplary codec having only 4 differential inputs, a multiplex switch 606 is used to manage the voltage and current signals being sent by the other two voltage divider/amplifiers 304 b, c and current from programmable scalers 302 b, c. It is to be appreciated that if a codec having 6 differential inputs were used on the supervisory board, the need for the multiplex switch would be eliminated. By going to the use of the multiplex switch, however, construction of the board is simplified as stereo codecs with six differential pins are harder to come by, and generally more expensive.

The output from microprocessor 602 is sent to a first Gate Array Logic (GAL) chip 608, which in one embodiment can be a read only EPROM, which has been previously programmed. This first, supervisory GAL acts as the gate keeper for the system. Supervisory GAL 608 issues a master go signal in the absence of detecting any anomalies or abnormalities which exceed predetermined tolerances which would be cause for shut down. In essence, the supervisory processor through GAL 608 looks for a reason to shut down the system, such as a spike in voltage, a loss of voltage, a change in phase of voltage relative to current, or a loss of phase altogether. If none of the conditions are detected, the processor allows GAL 608 to issue the master "go" signal to proceed.

Separate clocks 612, 614, and 616 on the supervisory board are provided for the running of the supervisory processor 602, stereo codec 604 and a final enable GAL 610. In the illustrated embodiment, the stereo codec clock 614 sends timing signals to the supervisory processor, so the processor can associate the data signals being received from the codec with the phase board from which it was sent.

Calculations are performed by each phase board microprocessor 502a, 502b, and 502c, based on the incoming voltage and current information supplied by the voltage divider/amplifiers and the programmable scalers/amplifiers of the backplane board. The results of these calculations are sent to local phase board GAL 506a, 506b, and 506c respectively, illustrated in FIG. 3, which have been preprogrammed to receive the information from the microprocessor, and as further described below issue the appropriate 2 of the 3 signals (+ and go, or − and go) to the supervisory board. The microprocessor 502a calculates VA when VA is negative (VAR), determines the VAR max and compares the calculated VAR max to the reference threshold value. If the calculated VAR max is above the reference threshold, the processor increments additional delay to the timer as compared to the previous, like half cycle. If the VAR max is less than reference threshold, the processor increments a decrease in the delay as compared to the previous like half cycle. If the VAR max is significantly less that the reference threshold, then the microprocessor will decrease the delay to zero.

In the illustrated embodiment of FIG. 5, each SSR includes two SCRs, inverted back to back. When one of the SCRs is triggered to the conducting state, the other SCR is non-conducting. Output 508a of GAL 506a comprises the three signals, "+", "−" and "go". The signal "+" in combination with "go" will enable the firing of one of the two back-to-back silicon controlled rectifiers (SCR) of SSR 102a (SSRs 102b and 102c separately controlled by dedicated phase boards 500b and 500c) during the positive half cycle phase. The "−" signal in combination with "go" will enable firing of the other of the two SCRs of SSR 102a during the negative half cycle. In essence, the combination of +/go and −/go authorization signals routed via the supervisory board to the auxiliary firing board enable the triggering of the SSRs.

Depending on the information received from the microprocessor, GAL 506 will set either the + and go pins high or the − and go pins high, to trigger the SCRs during the respective positive and the negative half cycles. When the voltage of a given half cycle crosses zero, the go signal is dropped, and the enable signal to the supervisory board is thus dropped. In this condition the SCR for that half cycle will turn off, or go non-conducting when the current crosses zero. At the same time the + (if in a positive half cycle) or − (if in a negative half cycle) signal is dropped, and the other signal, − or + is asserted. In this condition the SCR for the opposite polarity half cycle remains non-conducting, and will stay so until the go signal is re-asserted by the GAL 506, upon receiving the appropriate signal from the microprocessor after the timer times out. This process repeats itself with each half cycle, cycle to cycle.

The output 508a from local phase board GAL 506a is sent to the final enable GAL 610 on supervisory board 600. This chip, which in one embodiment is a write-once programmable chip, provides authorization to trigger the firing board, by allowing the enable signals from the phase boards to pass on. Only when the final enable GAL 610 has failed to receive the master "go" signal from supervisory GAL 608, will it block the sending of the "+/go" and/or the "−/go" signals.

Signals 620 from final enable GAL 610 on the supervisory board are routed back to the back plane board to the appropriate one of six opts isolators 306. The outputs 620' of the opts isolators are then routed through connector 308 to auxiliary firing board 700. While the opts isolators in the embodiment illustrated are shown being resident on the back plane board, it is to be appreciated that it is not required these components be so located. The purpose of opto-isolators 306 is to receive the digital "enable" signals from final enable GAL 610, and convert them into analogue signals to be sent to the firing board, each isolator connected in series to one of the two silicon controlled rectifiers in each of the three SSRs. These isolators are one way devices, which contain a light emitting diode. The signal from the supervisory board causes the diode to emit a series of light pulses which activates a photo transistor, thus defining a unidirectional signal. The signal from the photo transistor is then outputted from the isolator to connector 308 resident on the backplane board. The opto isolators used in the board construction are themselves selected from standard off the shelf, commercially available components.

With reference to FIG. 5, the general layout of auxiliary firing board 700 is illustrated, the board, as a matter of convenience provided as a stand-alone component, separate from the backplane mother board. The board houses firing transformers 702 used to activate the SSRs. The board receives analogue firing signals 620' from opto isolators 306, 30 VDC and ground from the backplane board, and using dedicated electronic components converts these inputs into signals used to change the conducting status of the silicon controlled rectifiers. In the illustrated embodiment, board components include a plurality of photo Darlingtons 704, which receive the signals routed by connector 308. The photo Darlingtons 704 are similar to the opto isolators, and serve to complete a circuit to charge the various primary firing coils. Each of the 6 illustrated photo Darlingtons receives a signal from a corresponding opto isolator, and processes that signal to drive the corresponding transformer.

The firing transformers 702 are driven by an analogue 30V source via connector 308 from Power Supply Board 400. When the circuit is broken, the opening of the circuit controlled by the photo Darlington, the primary transformer coil dumps its charge onto a secondary transformer coil, which steps up the voltage several fold, for example to 100 V to trigger, that is fire the SCRs which in turn defines the conducting state of the SSR.

Firing transformers 702 operate as paired sets. Each pair is used to control the status of one of the two back-to-back SCRS of each SSR in each of the three input lines a, b, and c. It is the firing of the transformer that generates the spike voltage which activates the SCR. To assure that the SCR is unaffected by voltage/current fluctuations, the triggered SCR is maintained in the conducting state by repeated pulses from the firing transformer. In one embodiment, the firing transformers output at 8 kHz, and continuously send spiked pulses to the SCR. When the firing of that transformer is no longer authorized, for example when voltage goes through zero, then the enable signal to the SSR is dropped, and the SCR at the end of that half cycle when the current passes through zero turns off, i.e. goes non-conducting. Meanwhile, the other SCR which was non-conducting when the first SCR was conducting remains in the non-conducting state through the next half cycle (negative if the preceding half cycle was positive, and positive if the preceding half cycle was negative) until rendered conducting again by receipt of a voltage trigger from its assigned firing transformer. Thus, for a period of time when neither SCR is conducting, the flow of power to the motor in the controlled input line is interrupted.

As previously noted, when the SCR is in a conducting state, current will flow to the motor during the half cycle though the input line controlled by the SSR. The SCR will remain in the conductive state until the voltage and current both pass through zero. With reference again to the GALs 506 a-c on the phase boards, when the voltage crosses zero from positive to negative or negative to positive, the go signal is dropped and the firing sequence of the associated transformer ended. When the current crosses zero, the go signal having been already dropped, the SCR which it drives goes non-conducting. Thereafter in the non conducting state, the flow of power through the line to the motor is interrupted. The SSR remains in the non conducting state, until the second of the back to back SCRs is triggered to the conducting state again. Until this time, no power flows through the SSR until the second opposite polarity SCR is turned on, the delay in turning the SCR on a function of the VAR calculation and comparison performed by the microprocessor. Thus, at the appropriate time during the next half cycle, power is again allowed to flow to the motor through the remainder of the half cycle.

As can be seen from the above a method and apparatus is described which can, based on the measured values of VA, calculate the VAR in each of the three input lines to a three phase AC inductive motor and make adjustments in order to reduce the VAR in the system, thus improving motor efficiency.

The motor load controller (MLC) of this invention is designed for installation with new or existing motors. The motor load controller is provided in the form of an electronic box designed to replace the motor starter, the box connected at its input side to three phase wires and a ground coming from the power source, usually a source circuit breaker panel at the installation facility. It is connected at its output side to three load wires and a ground which in turn are connected to the motor to be controlled. In one embodiment, a surge suppressor may be added to the system, and when used, it should be installed on the incoming side, ahead of the MLC.

Having thus described the operation of the system, its Start Up mode will now be described. At installation start up, the MLC is put into a Learn Mode by the person installing the system, and the motor to be controlled started and put into a full load condition. Proper direction of the motor is verified by the installer. The motor will stop after the Learn Mode cycle has been completed, and the proper settings made to the various component devices of the MLC. If during Learn Mode, the MLC does not detect all three phases, the motor will not start and an error indicator will be lit. In one embodiment, the power, the three phase and the supervisory boards are provided with a number of on-board light emitting diodes (LEDs) which will light up to the status such as to flag an error, each of the LED's wired to indicate a particular status.

Once learn mode is completed, the system is ready for start up. During a pre-start routine, the supervisory board verifies that all three phases are continuously present and at valid operating voltages. The supervisory board also tests the DC supply voltages to the backplane board being provided by the power board, verifying all DC voltages are present and at appropriate levels.

Once the pre start routine has been completed, and it has been verified that the system is functioning properly, the supervisory board loads the phase boards operational program from the supervisors $2^{nd}$ flash ram into a dual port RAM (not shown) located on each of the three phase boards. The operational program can be stored in a standard memory device such as a hard disk, EPROM or Flash memory chip, the location of which, though not a part of this invention, in one embodiment is resident on the backplane board. Once the phase board RAMs are loaded and verified, the supervisory board releases the reset on the phase boards and enables the voltage and current inputs to the phase boards.

In the next, Soft-Start mode, which is standard in Normal Run mode, and switch selectable in By-Pass Run mode, the maximum delay is applied to the triggering of the solid sate relays. The delay is reduced as every passing cycle completes, allowing the SSR to be conducting for more and more of the last portion of the half cycle on each half cycle of all three phases, until all delay has been eliminated. After Soft Start has been completed, the process continues with Normal Run mode or By Pass Run mode.

On start up of Normal Run mode, after the Soft-Start has completed, the timing delay starts at zero and with each half cycle increments the delay by a present amount, and then compares the resulting VAR calculation to the reference threshold value. If the VAR value is above the threshold value, the time delay is incrementally increased yet again, the incremental delays being cumulative. This process continues until the result of the VAR compare is the same as or below the threshold value, in which case the delay value is either unchanged or incrementally decreased during the next cycle, and a new compare performed. If the VAR max is significantly less that the reference threshold, then the microprocessor will decrease the delay to zero. This process continues during motor operation, the operating software programmed to maintain the resulting compare value about the threshold value.

In Normal Run mode, the phase boards monitor the voltage input and the current input. Each of the phase boards does its calculations on the load of the motor and determines whether or not to increment the delay value to an SSR up or down. For each half cycle, when the appropriate delay has been reached, an enable signal is sent to the supervisory board. If the supervisory board sees that the status of all functions is in good standing, the supervisory board will add the master enable, and a pulse clock signal, and send the pulses to the pulse transformers, thereby supplying the trigger to the SCRs of the SSRs.

The supervisory board verifies that all three phases are continuously present and that valid operating voltages and current for all 3 phases are within range of each other. During operation of the MLC, if the supervisory board sees that any of the DC voltages are present but slightly out of tolerance, the supervisory board will allow operation, but will issue a warning indicated by lighting up one of the on board LEDs, or through other electronic display options, such as externally visible LEDs or a display screen. If the supervisory board detects a loss of phase or phase current imbalance, the board will completely shut down and indicate the error. If so selected, after restoration and stabilization of the loss of phase, the MLC will automatically restart and indicate that a loss of phase or phase current imbalance has occurred. Otherwise, the supervisory board will initiate an emergency shutdown to protect the motor. Should an emergency shutdown be initiated, an error status flag will be displayed.

In an embodiment of the invention, the MLC can be operated in a By Pass mode, where in essence, the timing of the triggering signals is set during Soft Start, if the Soft Start option in selected for By Pass mode, and the phase boards thereafter not used to calculate the incremental timing changes to be applied to the timing of SCR activation. In this mode, the supervisory board performs the monitoring functions as previously described. If Soft Start is not selected, then the phase boards are put in an idle state, and the firing signals are provided by the supervisory board. In this mode the supervisory processor continues to monitor the status of the system and issues a bypass signal to final enable GAL 610. When final enable GAL 610 receives the bypass signal, it turns on all 6 outputs 620 to the opto isolators. Thus the firing signals to the firing transformers are always in the enable state, and the back to back ±SCRs are always on during the relevant half cycle, the system operating as if the MLC were not in place except to shutdown in case of phase voltage input failure. This mode of operation is useful where one wishes to compare the energy consumption of the motor with and without the use of the MLC. Secondarily, By Pass mode can be used to keep a motor running in the event one of the phase boards goes out, until such time as the board can be replaced.

The embodiments of the invention have been described in connection with a three phase motor. It is to be appreciated, that it may also be used to improve the operational efficiency of any other electrically operated system which presents three phase AC inductive loads, such as a three phase transformer.

While the foregoing is directed to embodiments of the present invention, other and further embodiments of the invention may be devised without departing from the basic scope thereof, and the scope thereof is determined by the claims that follow. Many of the components described above were selected due to the fact they were readily commercially available, and thus reduced the cost of the construction of the control system. Other components or combination of components could be used without departing from the scope of the invention. Also, the values described in the detailed description are exemplary, and used for the purpose of illustration of the operation of the various embodiments. In no way are such values intended to be considered as limiting of the invention. As such, it should be understood that the descriptions contained herein are not intended to be exhaustive or to limit the invention to the precise form disclosed.

The invention claimed is:

1. In a method of controlling the input to a three phase inductive load from a three phase AC power supply wherein a measure of reactive power in at least one input line to the load is determined during a time period, and a solid state relay is connected in series in said input line between the power supply and the inductive load and maintained in a non-conducting state for a subsequent period of time, the length of which subsequent period of time is determined by analyzing the measure of VAR, the improvement comprising:
   analyzing the measure of VAR using a microprocessor dedicated to handling the calculation for said one input line;
   wherein the measure of reactive power is determined in each of the three input lines to the induction load, the analyzing step for each line performed by a separate microprocessor;
   wherein the measure of VAR and the analyzing step is conducted during each half cycle of the AC input; and
   wherein during a half cycle, the VAR for that half cycle is calculated, along with the length of the subsequent period of time during which a solid state relay is to be maintained in the non conducting state during the next like half cycle.

2. In a method of controlling the input to a three phase inductive load from a three phase AC power supply wherein a measure of reactive power in at least one input line to the load is determined during a time period, and a solid state relay is connected in series in said input line between the power supply and the inductive load and maintained in a non-conducting state for a subsequent period of time, the length of which subsequent period of time is determined by analyzing the measure of VAR, the improvement comprising:
   analyzing the measure of VAR using a microprocessor dedicated to handling the calculation for said one input line;
   wherein the measure of reactive power is determined in each of the three input lines to the induction load, the analyzing step for each line performed by a separate microprocessor; and
   wherein a fourth microprocessor is used to monitor the operation of said three controllers.

3. The method of claim 2 further including a first learning mode step in which the settings used to control the programming of sensor modules based on the operating characteristics of the three phase inductive load to be controlled.

4. The method of claim 1 wherein the three phase inductive load is an alternating current inductive load.

5. A method for controlling the flow of power to an alternating current AC inductive load from a power supply to interrupt the flow of power to the motor for determined period of time, the method, comprising the steps of:
   (a) continuously measuring the current and voltage in a first input line,
   (b) determining the VA for said first line during a first AC half cycle,
   (c) storing the determined VA value when the product goes negative,
   (d) continuing the calculation of VAR, and for each VAR value calculated thereafter, comparing it to the absolute value of the preceding calculated VAR value, and storing the new value as the VAR max, until such time as the calculated VAR value is less than the VAR value previously calculated,
   (e) during the following AC half cycle of opposite polarity, comparing the VAR max value against a reference threshold, and if the determined difference varies by more than a predetermined amount, then applying a predetermined timing increment to increment the length of a time delay used to control the conductive state of an solid state relay connected in series with the inductive load, and (f) during a next, third, AC half cycle of the same polarity as the first half cycle, triggering said solid state relay to the conducting state at the end of the incremented time delay.

6. The method of claim 5 wherein the AC inductive load is a three phase AC inductive load and the steps for incrementing the length of time delay used to control the conductive state of an solid state relay connected in series in each of the three input lines are performed for each line.

7. The method of claim 5 wherein during the second AC half cycle, the VAR calculation for that half cycle is conducted, with the calculated VAR value is stored as the VAR max, until such tune as the subsequent calculated VAR value is less than the previous value calculated, in which case the previous VAR max value is used during the next, third, half cycle of opposite polarity to compare to a stored reference threshold.

8. The method of claim 7 wherein during said third half cycle, difference between the referenced and VAR max is compared, and if the determined difference varies by more than a predetermined amount, then incrementing the length of the time delay used to control the conductive state of said solid state relay connected in series with the inductive load.

9. The method of claim 8 wherein during a forth, AC half cycle of the same polarity as the second half cycle, triggering said solid state relay to the conducting state at the end of the incremented time delay.

10. An apparatus for controlling the input to a three phase alternating current inductive load from a three phase power supply that comprise:
   a plurality of solid state relays connected in series in each of the three input lines from the power source, the solid state relay connected in series between the power supply and the inductive load,
   a plurality of voltage taps for determining a measure of the instantaneous voltage present in each of the three input lines,
   a plurality of current detectors that determine the instantaneous current present in each of the three input lines; and,
   a microprocessor associated with each input line that receives a measure of the voltage and current in each of the lines, said controller used to determine a measure of the reactive power in the line with which it is associated, the microprocessor forwarding signals to a corresponding solid state relay for that input line, whereby the solid state relay when in a nonconducting state, is maintained in the non-conducting state for a subsequent period of time, wherein the length of the subsequent period of time is determined by analyzing the measure of VAR;

wherein said microprocessor includes a master controller which monitors the output from each of three dedicated microprocessors, and controls the sending of the signals to the solid state relays used to change their state from non conducting to conducting.

11. The apparatus of claim 10 further including a transformer to reduce the incoming voltage coming from the input lines, prior to a voltage signal being sent to the controller to calculate the measure of VAR.

12. The apparatus of claim 10 wherein said microprocessor determines a product of voltage and current, and for that time during which the product is negative, determines whether or not the negative product is larger or smaller than a previously determined product measure of a previous like period of time.

13. The apparatus of claim 12 where said microprocessor adjusts the length of the time in which the solid state relay is to be maintained in a non-conducing state depending upon whether the measure is larger or smaller than a previously determined measure.

14. The apparatus of claim 10 further including means for converting a signal from the controller into a signal for converting the solid state relays to the conductive state.

* * * * *